United States Patent [19]

Ohba et al.

[11] Patent Number: 4,479,120
[45] Date of Patent: Oct. 23, 1984

[54] METHOD AND APPARATUS FOR DRIVING A THIN-FILM EL PANEL

[75] Inventors: Toshihiro Ohba; Masashi Kawaguchi, both of Nara; Hiroshi Kinoshita; Yoshiharu Kanatani, both of Tenri; Hisashi Uede, Yamatokoriyama, all of Japan

[73] Assignee: Sharp Kabushiki Kaisha, Osaka, Japan

[21] Appl. No.: 310,753

[22] Filed: Oct. 13, 1981

[30] Foreign Application Priority Data

Oct. 15, 1980 [JP] Japan .................. 55-145014

[51] Int. Cl.³ .............................. G09G 3/30
[52] U.S. Cl. ......................... 340/781; 340/805; 340/812; 340/713; 315/169.3
[58] Field of Search ............ 340/771, 772, 779, 781, 340/805, 811, 812, 713; 315/169.3, 169.1

[56] References Cited

U.S. PATENT DOCUMENTS 4,152,626 5/1979 Hatta et al. .................. 340/805
4,301,451 11/1981 Barta ........................ 340/781

*Primary Examiner*—Marshall M. Curtis
*Attorney, Agent, or Firm*—Birch, Stewart, Kolasch & Birch

[57] ABSTRACT

A display device includes an EL panel including an array of scan electrodes, an array of data electrodes crossing the scan electrodes and a plurality of pixels each lying sandwiched between a respective one of the scan electrodes and a respective one of data electrodes, a circuit for applying sequentially a write pulse voltage $V_W$ to the scan electrodes in a line scanning fashion and a circuit for applying a refresh pulse voltage $V_R$ of a polarity opposite that of the write pulse voltage $V_W$ throughout the panel upon completion of field scanning. A circuit is further provided for applying throughout the display panel upon completion of field scanning a pulse voltage having the same polarity as that of the refresh pulse $V_R$ and an amplitude insufficient to cause electroluminescence. Alternatively, a pulse voltage having a polarity opposite that of the refresh pulse $V_R$ and an amplitude insufficient to cause electroluminescence may be applied after the application of the refresh pulse $V_R$ is completed.

10 Claims, 7 Drawing Figures

METHOD AND APPARATUS FOR DRIVING A THIN-FILM EL PANEL

BACKGROUND OF THE INVENTION

This invention relates to a display device having a thin-film three-layered EL structure and more particularly a method for driving the display device for assuring legibility of a visual display and reliability of long-term operation.

A thin-film EL display panel is constructed with an array of scan electrodes and an array of data electrodes crossing the scan electrodes in a direction normal thereto and a number of EL pixels lying sandwiched between a respective one of the data electrodes and a respective one of the scan electrodes. After scanning is completed throughout the panel by the sequential application of a write pulse $V_W$ to the scan electrodes in a line scanning fashion, a refresh pulse of an amplitude $V_R$ is applied to complete an alternating cycle of driving.

Whether or not respective pixels on the same scan electrode are excited is determined by pre-charging by a modulation voltage $V_M$ and especially with supplying the pixels desired to be excited with a write voltage of $V_W+V_M$ and supplying those desired to be non-excited are supplied with a write voltage of $V_W-V_M$. This driving method is suggested by many patents which are assigned to the assignee of the present application, for example, U.S. Pat. No. 3,946,371 to K. Inazaki et al, U.S. Pat. No. 3,967,112 to Y. Kanatani et al, U.S. Pat. No. 4,024,389 to Y. Kanatani et al, U.S. Pat. No. 4,070,663 to Y. Kanatani et al, etc. These patents are hereby incorporated by reference into the specification of the present application. With those suggested driving methods, a so-called burning phenomenon takes place where a fixed display pattern of figures and characters remains when the display panel has displayed the fixed display pattern for a substantial period of time and an attempt is made to return the panel to its original or non-displayed state.

OBJECT AND SUMMARY OF THE INVENTION

Accordingly, it is an object of the present invention to provide a method for driving a thin-film EL display panel which overcomes the above mentioned burning phenomenon.

According to the present invention, there is provided a display device comprising an EL panel including an array of scan electrodes, an array of data electrodes crossing the scan electrodes and a plurality of pixels each lying sandwiched between a respective one of the scan electrodes and a respective one of data electrodes, means for applying sequentially a write pulse voltage $V_W$ to the scan electrodes in a line scanning fashion and means for applying a refresh pulse voltage $V_R$ of a polarity opposite that of the write pulse voltage $V_W$ throughout the panel upon completion of field scanning. The display device embodying the present invention is characterized by the provision of means for applying throughout the display panel upon completion of field scanning a pulse voltage having the same polarity as that of the refresh pulse $V_R$ and an amplitude insufficient to cause electroluminescence. Alternatively, a pulse voltage having a polarity opposite that of the refresh pulse $V_R$ and an amplitude insufficient to cause electroluminescene may be applied after the application of the refresh pulse $V_R$ is completed.

BRIEF DESCRIPTION OF THE DRAWINGS

For a more complete understanding of the present invention and for further objects and advantages thereof, reference is now made to the following description taken in conjunction with the accompanying drawings, in which.

DETAILED DESCRIPTION OF THE INVENTION

As noted previously, the present invention is an effective measure for overcoming the burning phenomenon in an thin-film EL panel. The results of measurements of the pixels in which the burning phenomenon took place reveal the following aspects.

Figure 1:
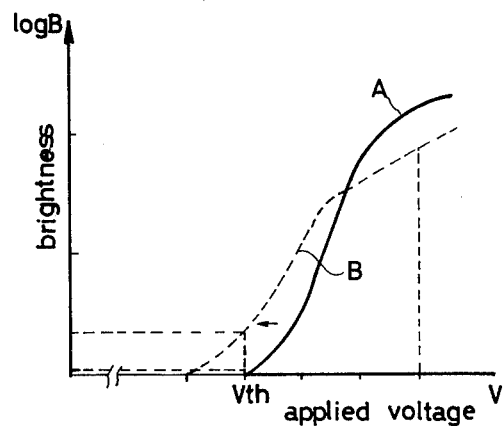
FIG. 1 is a graph for explaining voltage vs. brightness characteristics between a burned pixel and a non-burned pixel.

(1) The comparison of voltage vs. brightness characteristics between abnormal pixels suffering from the burning phenomenon and normal ones is illustrated in FIG. 1. The curve A shows a non-burned pixel and the curve B shows a burned pixel. It is clear from FIG. 1 that the burning phenomenon is one where brightness increases within a firing voltage region with the passage of time and decreases within a high brightness region.

(2) The burning phenomenon appears gradually from the bottom and top of a display area with the passage of time while the display pattern is fixed. In other words, the burning phenomenon is amplified as the phase of the write pulse $V_W$ shifts toward that of the refresh pulse.

(3) The greater the degree of the burning phenomenon affecting the pixels, the greater the difference between the amplitude of polarization occurring after application of the refresh pulse and that occurring after application of the write pulse, so that the amplitude of polarization is greater at an upper portion of the display area than at a lower portion after application of the refresh pulse and the amplitude of polarization is greater at the lower portion of the display than at the upper after application of the write pulse.

Figure 2:
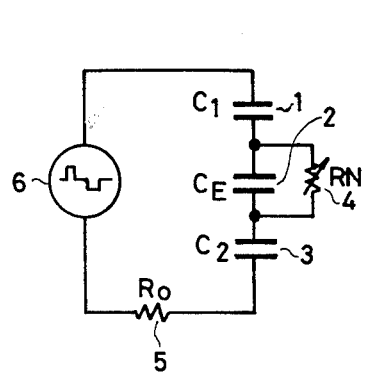
FIG. 2 is an equivalent circuit diagram of a thin-film EL display panel.

Based upon the foregoing findings, the burning phenomenon is believed to take place for the following reasons, as best shown in FIG. 2 showing an equivalent circuit of the thin-film three-layered structure EL panel.

Figure 3:
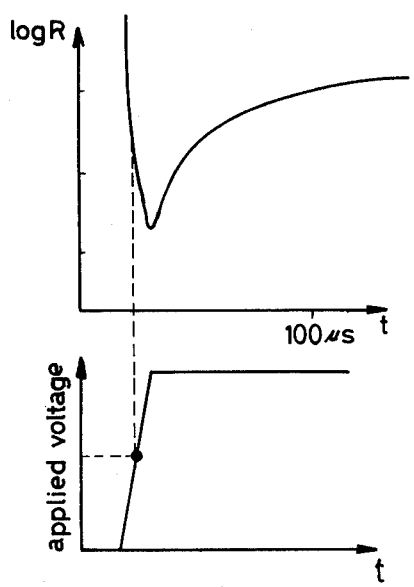
FIG. 3 is a graph for explaining timewise variations in $R_N$.
Figure 4A:
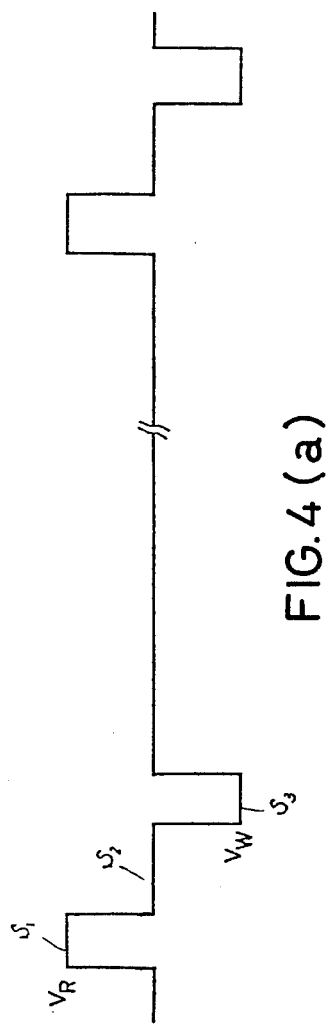
FIGS. 4(a) and 4(b) are views for explaining the reason why a burning phenomenon takes place.
Figure 4B:
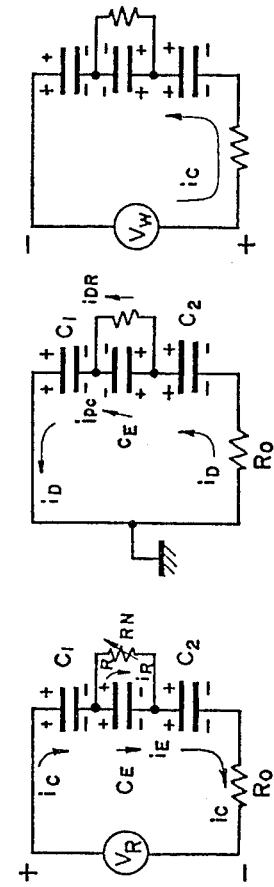

In FIG. 2, there is illustrated in an equivalent circuit view including a layer 1 of dielectric material such as $Y_2O_3$ with a capacitance $C_1$, a layer 2 (or 4) of $Z_nS$ having a capacitance $C_E$ and a resistance $R_N$, doped with a proper activator such as $M_n$, a layer 3 of dielectric material such as $Y_2O_3$ with a capacitance $C_2$, and one or more transparent electrodes 5 such as $I_{n2}O_3$ with a resistance $R_o$. There is further illustrated an external AC pulse source 6. It is noted that, when the voltage across CE in FIG. 2 showing the equivalent circuit of the three-layered structure EL panel reaches a firing voltage, the resistance of the $Z_nS$ layer $R_N$ abruptly drops as seen from its time-wise variations in FIG. 3. To illustrate the reason why the burning phenomenon takes place, assume now that the refresh pulse $V_R$ and the write pulse $V_W$ are correlated in such a phase relationship that the latter $V_W$ is applied a relatively short period of time after application of the former $V_R$ throughout the panel as seen from FIG. 4(a) wherein operational conditions $S_1$, $S_2$ and $S_3$ in FIG. 4(a) are depicted in its equivalent circuits as indicated in FIGS. 4(b)(1), 4(b)(2) and 4(b)(3). The condition $S_1$ represents one where the refresh pulse has been applied but not removed yet. Upon application of the refresh pulse the voltages across $C_1$, $C_2$ and $C_E$ increase with charging current $i_c$. In this case it is estimated that $i_c \approx i_E$. When the voltage across $C_E$ reaches the firing voltage, $R_N$ resistance drops abruptly as shown in FIG. 3. The charging current $i_c$ is therefore divided into two flows $i_E$ and $i_R$ between both ends of $C_E$.

After the sum of the voltages across $C_1$, $C_2$ and $C_E$ is in excess of the refresh voltage $V_R$, resistance $R_N$ does not become infinite as indicated in FIG. 3 so that a closed discharging circuit is formed between both ends of $C_E$ and the voltage across $C_E$ decreases. Because the refresh voltage $V_R$ is a fixed value, an increase in the voltages across $C_1$ and $C_2$ resulting from the charging current $i_c$ compensates for a drop in the voltage across $C_E$. Immediately before the refresh pulse $V_R$ is reduced to "zero", electric charges $Q_1$ and $Q_2$ accumulated on $C_1$ and $C_2$, respectively, are correlated with that $Q_E$ accumulated on $C_E$ as follows due to the above-mentioned two events (that is, division of the charging current $i_c$ into $i_R$ and $i_E$ and decrease in the voltage across $C_E$).

$$Q_1 = Q_2 > Q_E \qquad (1)$$

The condition $S_2$ is one where the refresh pulse has been removed but the write pulse $V_W$ has not been applied yet. Upon removal of the refresh pulse discharging current $i_D$ flows until the voltage across the EL panel is reduced to "zero". On assumption that $R_N$ is not infinite, the discharging current $i_D$ is divided into two definite flows one $i_{DR}$ through $R_N$ and the other $i_{DC}$ through $C_E$. The value of $R_N$ in normal condition is several orders as higher than its condition when the pixel is being discharged from electroluminescence. Assuming that $Q_1'$, $Q_2'$ and $Q_3'$ are electric charges accumulated on $C_1$, $C_2$ and $C_E$ and most of the discharging current $i_D$ has been consumed.

$$Q_1' = Q_1 - \int i_D dt \qquad (2)$$

$$Q_2' = Q_2 - \int i_D dt \qquad (3)$$

$$Q_E' = Q_E - (\int i_D dt - \int i_{DR} dt) \qquad (4)$$

$$Q_1' = Q_2' \qquad (5)$$

$$Q_1' + Q_2' + Q_E' = 0 \qquad (6)$$

Furthermore, presuming that $R_N$ is limitless and $i_{DR} dt = 0$, it is evident in view from formula (1) that formulae (2) or (3) and (4) indicate subtraction of the same charge from different electric charges. Formula (6) should therefore also be satisfied.

$Q_1$, $Q_2 > Q_E$ in formula (1) shows that $Q_E'$ is a negative charge accumulated or an amount of negative polarization and $Q_1'$ and $Q_2'$ are positive charges. These positive and negative polarities are shown in FIG. 4(bX2). The charge $C_E$ accumulated or the amount of this polarized charge has the same polarity as that of the write pulse voltage $V_W$ so that it may be superimposed on the write pulse voltage. FIG. 4(a)(3) depicts such situation. It is obvious from formula (4) that the amount of the polarized charge decreases on assumption that $R_N$ is a limited value. It is however noted that there is no need to change the polarity of the polarized charge because of $R_N$ resistance when this occurs as resistance $R_N$ is substantially larger in this case than when charging is under process with accompanying elecrolumiscence as stated previously. Assuming further that $R_N$ has a limited value even after the charging current $i_D$ has been consumed and the sum of the voltages across $C_1$, $C_2$ and $C_E$ has been decreased to "zero", there is formed a discharging circuit of a time constant $C_E R_N$ across $C_E$, attenuating the amount of the polarized charge. It seems that such attenuation with the time constant $C_E R_N$ is not merely exponential but dependent upon the time-wise variations in the value of resistance $R_N$ as depicted in FIG. 3.

Figure 6:
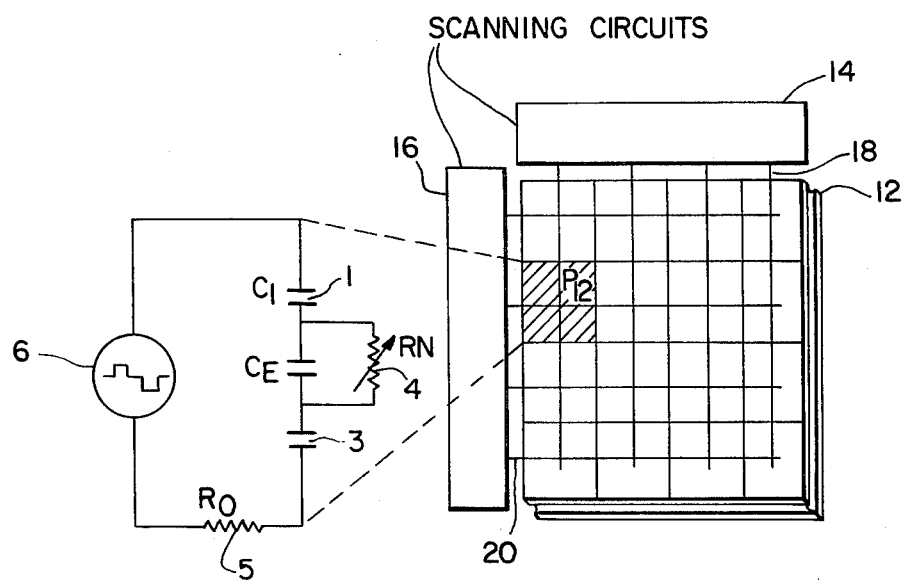
FIG. 6 illustrates how the equivalent circuit of FIG. 2 is incorporated into a matrix display.

FIG. 6 relates the equivalent circuit of FIG. 2 to a matrix display panel using the technique of the present application. Each pixel (for example $P_{12}$ of FIG. 6) of the matrix display 12 of FIG. 6 includes the equivalent circuit of FIG. 2. As horizontal scan circuit 14 and vertical scan circuit 16 develop signals on a plurality of pulsed scan electrodes 18 and data electrodes 20.

For the pixels where the write pulse is in such phase relationship as to be applied immediately after application of the refresh pulse $V_R$ (usually on the upper portion of the display area), the write pulse is superimposed under the attenuation condition with a smaller amplitude of the polarized charge originating from the applied refresh pulse and the refresh pulse is therefore applied under attenuation conditions with a large amplitude of the polarized charge originating from the write pulse applied. On the other hand, for the pixels where the refresh pulse is in such phase relationship as to be applied immediately after application of the write pulse (usually on the lower portion of the display area), the amount of the polarized charge to be superimposed on the write pulse and the refresh pulse is clearly in reverse relationship with the first mentioned pixels. This consideration exactly agrees with the results of the measurements with regard to the burning phenomenon as suggested previously. Therefore, it is concluded that the burning phenomenon takes place due to unbalance or asymmetry of the amount of the polarized charges prior to application of the refresh pulse or prior to application of the write pulse.

The present invention is intended to provide a method for driving a thin-film EL panel in which the amount of the polarized charges is attenuated sharply prior to the development of the next refresh pulse or the next write pulse to thereby lessen the difference or asymmetry in the amount of the polarized charges in an attempt to elimiate the occurrence of the burning phenomenon.

Figure 5:
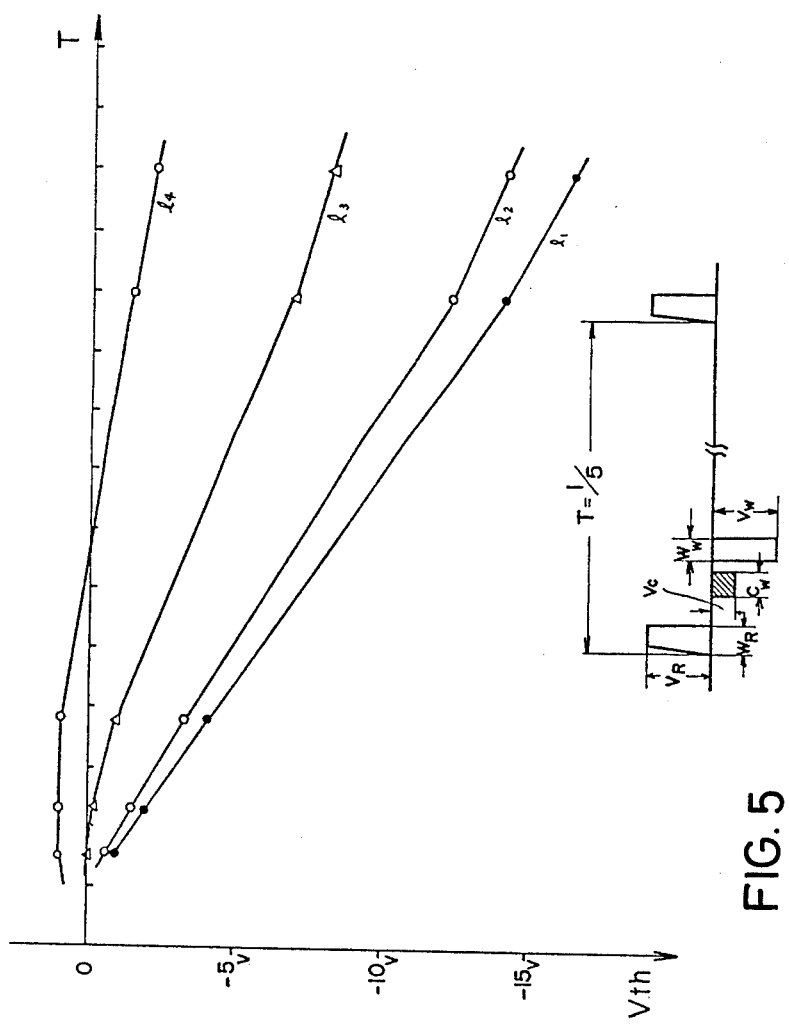
FIG. 5 is a view for explaining the effect of a compensation pulse as a function of a voltage amplitude.

A specific embodiment of the present invention will now be described by reference to the accompanying drawings. It is believed that $R_N$ has a relatively small value after application of the refresh pulse or the write pulse. (cf. FIG. 3). Accordingly, application of a pulse voltage having a polarity opposite that of an enabling voltage pulse (this is referred to as "compensation pulse" hereinafter) after application of the enabling voltage pulse seens effective in drastically attenuating the amount of the polarized charges. As is clear from the description with respect to the situation $S_2$, such application causes polarization in the opposite direction through operation of $R_N$ and offsets the amount of the polarized charge originating from the enabling voltage pulse applied. In connection with the effect of the compensation pulse, the results of its measurements are plotted in FIG. 5 as a function of voltage. In this drawing, the curve $l_1$ was drawn when $V_c = 0$ (v), the curve $l_2$ when $V_c = 30$ (v), the curve $l_3$ when $V_c = 60$ (v) and the curve $l_4$ when $V_c = 90$ (v). Measuring conditions were f (frequency) = 500 Hz, t = 85 usec, $W_R = W_W = 40$ usec, $V_R = V_W = V_{th} + 30$ (v) and $C_W = 55$ usec. In FIG. 5, the abcissa is plotted with aging time T and the ordinate is plotted with the threshold voltage $V_{th}$ or firing voltage. A pulse region as denoted by the slant line is the compensation pulse. Analysis of FIG. 5 indicates that the compensation pulse exhibits a remarkable effect on the elimination of the burning phenemenon. In the case where the voltage value of the compensation pulse is selected higher than the emission threshold voltage level or firing voltage, the EL panel may exhibit a drop in contrast and deterioration in legibility. In an embodiment of the present invention, the thin-film EL display panel is supplied sequentially the write pulse voltage $V_W$ to the scan electrodes in a line scanning fashion and subsequently supplied the refresh pulse voltage $V_R$ of a polarity opposite that of the write pulse voltage $V_W$ throughout the panel upon completion of field scanning. Furthermore, a compensation pulse is applied throughout the display panel upon completion of field scanning, the compensation pulse voltage having the same polarity as that of the refresh pulse $V_R$ and an amplitude insufficient to cause electroluminescence. Alternatively, the compensation pulse voltage having a polarity opposite that of the refresh pulse $V_R$ and an amplitude not enough to cause electroluminescence may be applied after the application of the refresh pulse $V_R$ is completed. This driving method eliminates or at least lessens the burning phenomenon and therefore assures legibility and reliability for a longer period of time. The voltage level and shape of the compensation pulse is already depicted by the slant line in FIG. 5.

It is further undestood that the compensation pulse voltage compensates for not only the difference of the amount of the polarized charges caused by the above mentioned phase relationship but also the difference of the amount of the polarized charges due to amplitude, pulse width and leading edge effects. It is obvious that the present invention is equally applicable to any other type of EL panels, for example, a three-layered structure EL panel with its inherent memory effect, a two-layered EL panel including an EL layer and an insulator layer, and a three-layered EL panel including an EL layer, an insulator layer and another EL layer.

While only a certain embodiment of the present invention has been described, it will be apparent to those skilled in the art that various changes and modifications may be made therein without departing from the spirit and scope of the invention as claimed.

What is claimed is:

1. A display device comprising:
    an EL panel including an array of scan electrodes, an array of data electrodes crossing said scan electrodes and a plurality of pixels each lying sandwiched between a respective one of said scan electrodes and a respective one of said data electrodes;
    means for sequentially applying a write voltage pulse to each pixel of said display in a line scanning fashion;
    means for applying a refresh voltage pulse of a polarity opposite that of said write voltage pulse to the entire said panel upon completion of each single scan by said means for applying a write voltage pulse; and
    means for applying to the said display panel for each application of said refresh voltage pulse, a compensation voltage pulse for compensating for the difference of amplitude of polarized charges due to the difference in phase relationship between said refresh voltage pulse and each write voltage pulse among said pixels.

2. A display device comprising:
    an EL panel including an array of scan electrodes, an array of data electrodes crossing said scan electrodes and a plurality of pixels each lying sandwiched between a respective one of said secan electrodes and a respective one of said data electrodes;
    means for sequentially applying a write voltage pulse to each pixel of said display in a line scanning fashion;
    means for applying a refresh voltage pulse of a polarity opposite that of said write voltage pulse to said entire panel upon completion of each single scan by said means for applying a write voltage pulse; and
    means for applying to the entire said display panel for each application of said refresh voltage pulse, a compensation voltage pulse having the same polarity as that of the refresh voltage pulse and an amplitude less than that required to cause electroluminescence.

3. A display device as set forth in claim 1 wherein said compensation voltage pulse has a polarity opposite that of the refresh voltage pulse and an amplitude less than that required to cause electroluminescence and is applied after each said refresh voltage pulse is applied.

4. A method of operating an electroluminescent display comprising:
    periodically applying a write voltage pulse to said display;
    applying a refresh voltage pulse having a polarity opposite said write voltage pulse to said display subsequent to the application of each write voltage pulse; and
    applying a compensation voltage pulse having an amplitude less than that required to cause electroluminescence for each sequence of said write and refresh voltage pulses;
    said compensation voltage pulse having an amplitude and polarity selected to correct residual burning coloration caused by display hysteresis characteristics.

5. The display device of claim 1 wherein said means for applying a compensation voltage pulse applies a pulse having the same polarity as said refresh voltage pulse after generation of said write voltage pulses to each said pixel of said display but prior to application of said refresh voltage pulse.

6. The display device of claim 1 wherein said means for applying a compensation voltage pulse applies a pulse having a polarity opposite to that of said refresh voltage pulse after generation of said refresh voltage pulse but before generation of said write voltage pulses to the pixels of said display.

7. The display device of claim 2 wherein said means for applying a compensation voltage pulse applies a pulse having the same polarity as said refresh voltage pulse after generation of said write voltage pulses to each said pixel of said display but prior to application of said refresh voltage pulse.

8. The display device of claim 2 wherein said means for applying a compensation voltage pulse applies a pulse having a polarity opposite to that of said refresh voltage pulse after generation of said refresh voltage pulse but before generation of said write voltage pulses to the pixels of said display.

9. The method of claim 4 wherein said step of applying a compensation voltage pulse applies a pulse having the same polarity as said refresh voltage pulse after generation of said write voltage pulses to each said pixel of said display but prior to application of said refresh voltage pulse.

10. The method of claim 4 wherein said step of applying a compensation voltage pulse applies a pulse having a polarity opposite to that of said refresh voltage pulse after generation of said refresh voltage pulse but before generation of said write voltage pulses to the pixels of said display.

* * * * *